United States Patent [19]
Augenblick et al.

[11] 3,944,928
[45] Mar. 16, 1976

[54] HARMONIC COMMUNICATION SYSTEM

[75] Inventors: Harry A. Augenblick, Mountain Lakes; Richard Keller, Livingston, both of N.J.

[73] Assignee: Microlab/FXR, Livingston, N.J.

[22] Filed: July 1, 1974

[21] Appl. No.: 484,766

[52] U.S. Cl. .................. 325/65; 325/15; 325/185; 343/68 R
[51] Int. Cl.² .......................................... H04B 1/10
[58] Field of Search ............ 325/1, 4, 8, 15, 37, 53, 325/65, 185, 492, 494; 343/6.5 R, 6.5 LC, 6.5 SS, 6.8 R, 6.8 SS; 340/151, 152 T

[56] References Cited
UNITED STATES PATENTS

| | | | |
|---|---|---|---|
| 3,098,971 | 7/1963 | Richardson | 325/185 X |
| 3,689,885 | 9/1972 | Kaplan et al. | 343/6.8 LC X |
| 3,713,148 | 1/1973 | Cardullo et al. | 343/6.8 R X |

*Primary Examiner*—Robert L. Griffin
*Assistant Examiner*—Robert Hearn
*Attorney, Agent, or Firm*—Ryder, McAulay, Fields, Fisher & Goldstein

[57] ABSTRACT

A communication system comprising a transmitter for radiating a carrier frequency signal, which may be modulated, to a data station. The station includes a rectifier for rectifying the received carrier signal to provide energy to the station elements. A data source at the station produces a data signal representative of the information to be transmitted. A harmonic generator produces harmonics of the carrier signal and the harmonic signal is modulated with the data or information signal. An antenna radiates the modulated harmonic signal to a receiver which demodulates the received signal to extract the information therefrom. Thus, a completely self-contained and economic system is provided, since the carrier signal per se supplies the energy to operate the data station.

Additionally, the communication system may include a carrier signal having an address encoded therein and the station may comprise an address decoder so that only a selected addressed station will transmit the desired data at any one time.

35 Claims, 18 Drawing Figures

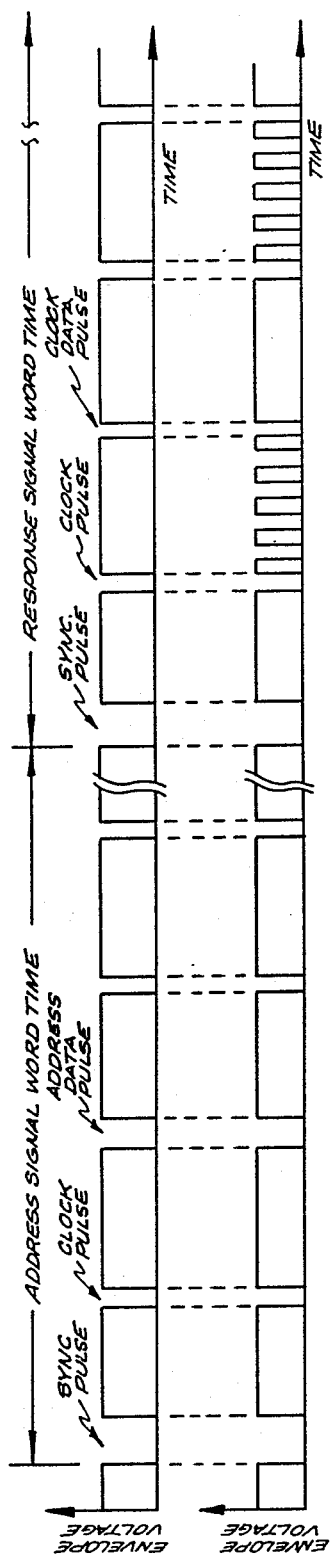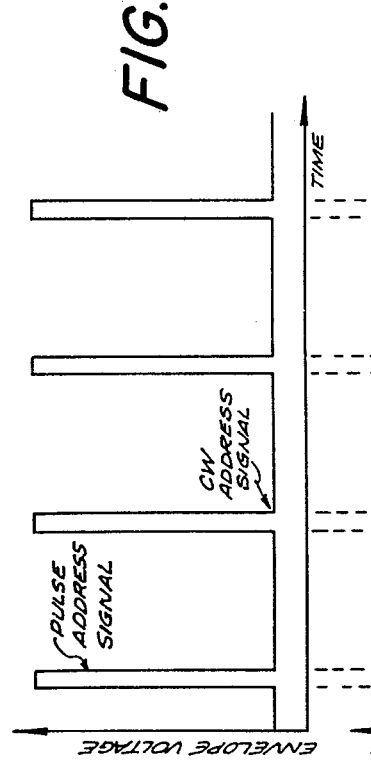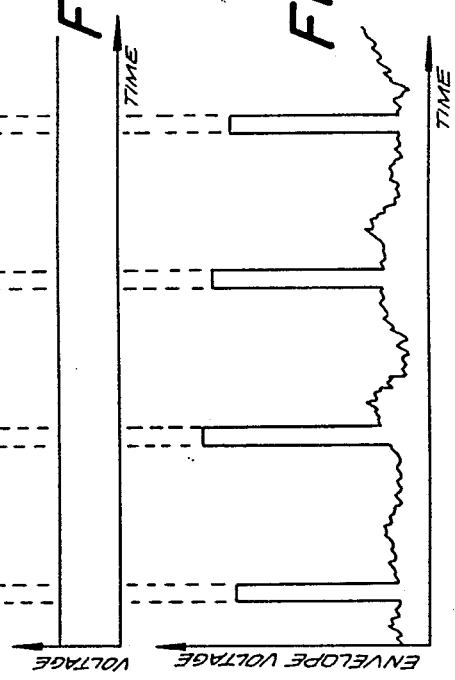

HARMONIC COMMUNICATION SYSTEM

The present invention comprises a harmonic communication system and, more particularly, pertains to a communication system having an information or data that does not require a source of energy other than the transmitted signal.

Many communication systems operate by transmitting an information containing signal from a remote station in response to a so-called illumination signal from an interrogating transmitter. In the most common type of system, the remote station includes a radio frequency or RF signal generator that produces a signal which is modulated by the data-containing signal and is transmitted to a receiver. Of necessity, the RF generator requires power from a local energy source which is usually provided by batteries. However, such battery powered stations or "targets", as they are sometimes called, are costly and require frequent battery replacements because of their relatively high current requirements. Moreover, the stations may be located in inaccessible places, thereby rendering battery replacement extremely difficult. In many cases, it has been found advisable to replace such inaccessible stations with a second station rather than to change batteries, thereby further increasing cost.

On the other hand, some communication systems use the received illuminating signal to provide power for the elements at the station. However, such systems suffer from the major disadvantage that they are inherently short range because of the high current requirements of the generator and because of the rather wide receiver bandwidth required by the relatively unstable rf oscillator typical of such systems.

Accordingly, an object of the present invention is to provide an improved communication system of the type that includes a remote station or target operable in response to an illuminating signal.

A more specific object of this aspect of the invention is the provision of a target communication system wherein the remote station is powered by the illuminating signal and at significantly longer ranges than previous systems.

Another object of the present invention resides in the novel details of circuitry that provide a communication system of the type described that is highly reliable and efficient in operation.

Accordingly, a communication system constructed according to the present invention comprises transmitting means for transmitting a signal having a preselected frequency to a remote station having station receiving means for receiving the signal. Information means is provided for producing an information signal and power means, connected to the station receiving means, produces a power signal from the transmitted signal to power the information means. A harmonic generator is also connected to the station receiving means and generates a harmonic signal of the transmitted signal and modulating means modulates the harmonic signal with said information signal. Radiating means is provided to radiate the modulated harmonic signal to a receiving unit. The receiving unit receives the signal and demodulates the same to obtain the information signal.

While harmonic transmission systems have been shown before in U.S. Pat. Nos. 2,927,321; 3,518,546; 3,631,484 and 3,798,642, for example, (the latter three patents having been assigned to the assignee of the present invention), none of these transmission systems have utilized the transmitted signal to power the elements of a remote station. Additionally, as, for example in U.S. Pat. No. 2,927,321 mentioned above, previous systems have been limited to the placement of a single remote station in the path of the transmitted signal. More specifically, if more than one station was positioned in the path of the transmitted signal, all stations would respond simultaneously thereby masking individual information signals.

Accordingly, an object of this aspect of the invention is to provide an improved harmonic communication system in which a plurality of remote stations may be positioned in the path of the transmitted signal.

A more specific object of this aspect of the invention is the provision of a harmonic communication system of the type described wherein each remote station is responsive to a different transmitted address code.

A feature of the invention is the provision of a synchronizing signal to synchronize the remote stations so that the stations respond to the address codes at different times thereby eliminating the possibility of the signal from one station masking the signal from another station.

Other features and advantages of the present invention will become more apparent from a consideration of the following detailed description when taken in conjunction with the accompanying drawings, in which:

FIG. 1 is a schematic wiring diagram, partially in block form, of a harmonic communication system constructed in accordance with the present invention;

FIGS. 2, 3, and 4 are schematic wiring diagrams partially in block form, of modified embodiments of systems of the present invention;

FIGS. 7A and 7B illustrate waveforms appearing at different points in the system shown in FIG. 3;

FIGS. 8A and 8B and 8C illustrate waveforms appearing at different points in the system shown in FIG. 4;

Figure 1:
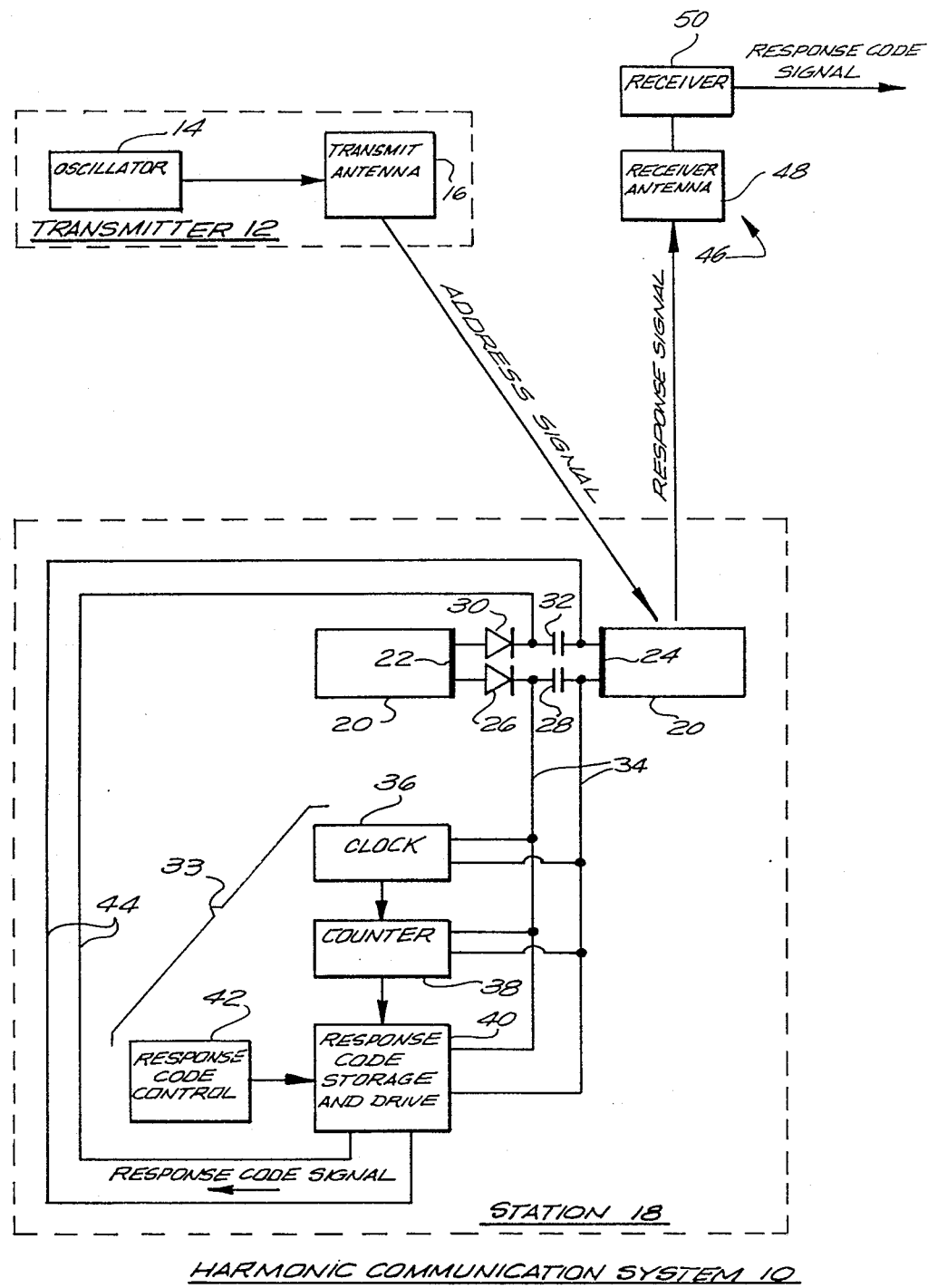
Figure 5A:
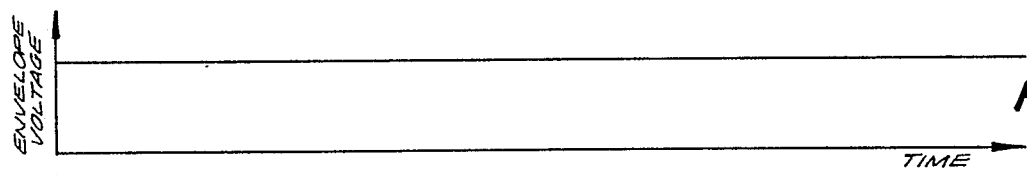
FIGS. 5A–5C illustrate waveforms appearing at different points in the system shown in FIG. 1.

A harmonic communication system constructed according to the present invention is designated generally by the reference numeral 10 in FIG. 1 and comprises a transmitter designated generally by the reference numeral 12. More specifically, the transmitter 12 includes an oscillator 14 which generates a carrier signal of frequency F. This signal is transmitted as an address signal from an antenna 16 that is connected to the oscillator 14. FIG. 5A illustrates the amplitude of the envelope voltage of this transmitted carrier signal.

A remote data station or target, generally designated by the numeral 18, is positioned in the path of the signal radiated from antenna 16. The target 18 comprises an antenna 20 which collects the transmitted signal and develops a corresponding potential difference across feed terminals 22 and 24. While antenna 20 is shown as a dipole antenna, almost every known type of antenna system can be used for this purpose, including slots, phased arrays, spiral antennas and reflector antennas. A series chain comprising a detector 26 and a bypass capacitor 28 is connected across the antenna feed terminals 22 and 24. A second series chain comprising a harmonic generator and modulator 30 and a bypass capacitor 32 is also connected across the antenna feed terminals 22 and 24.

The embodiment under consideration and the systems disclosed below may advantageously be operated in the microwave region. In particular, the transmitter 12 is adapted to transmit a signal of frequency 915 MHz. Moreover, the harmonic generator and modulator 30 is illustrated herein as a semiconductor diode that, because of its non-linear characteristics, functions as a harmonic generator which, as noted below, generates harmonics of the transmitted signal. Additionally, the diode also functions as a modulator to modulate the harmonic signal with an information signal. Similarly, the detector 26 may comprise a semi-conductor diode. However, the invention is not limited to this specific structure. The diodes 26 and 30 are, in effect, two-terminal diode networks that conduct current in a single direction only from one of the terminals to the other of the terminals of the respective two-terminal networks.

Figure 5B:
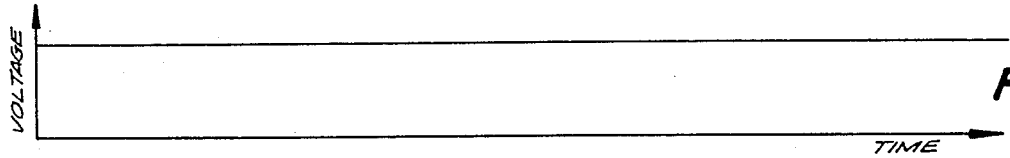

The transmitted signal is detected by the detector 26 and a DC potential is developed across the bypass capacitor 28, as shown on the voltage waveform-time graph of FIG. 5B. This DC potential is used to energize an information circuit 33 via leads 34. The information circuit comprises a series chain comprising a clock 36, a counter 38, and a response code storage and drive 40, all of which are connected to the leads 34. This series chain employs conventional digital techniques and produces a response code or information signal comprising a series of pulses when the potential across the bypass capacitor 28 exceeds a threshold voltage. The number duration, spacing, and modulation frequency of the pulses comprising such information signal is programmed to correspond to the identity of the particular station or target 18. In other words, clock 36 when energized by the DC potential, produces a series of pulses in the conventional manner. The counter 38, which is also energized or powered via the signal on the leads 34, counts the pulses produced by the clock. When a preselected count is reached, as determined by the response code storage and drive 40 (which is also energized by the DC potential between the leads 34), the circuit 40 produces the response code or information signal on the leads 44.

A response code control 42 may be connected to the response code storage and drive 40 to alter the number, duration, spacing, and modulation frequency of the pulses comprising such response code or information signal, in which case the response code signal corresponds to the condition of the target 18 or, more particularly, to the condition of the response code control 42. The response code control 42 may be operated by manual switches or by a sensor. The response code signal produced by the information circuit is shown in the voltage waveform-time graph of FIG. 5C and is applied across the bypass capacitor 32 via the leads 44. The response code storage and drive circuit 40 and the response code control circuit 42 are described in greater detail in conjunction with the corresponding elements of the system of FIG. 2.

Figure 5C:
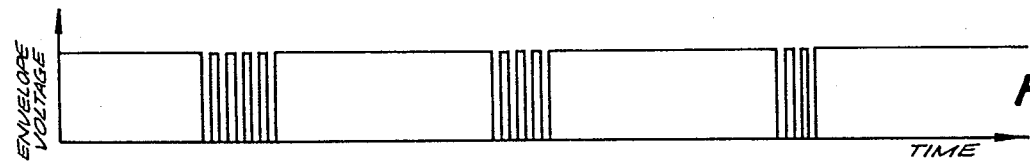

Assuming that the signal from transmitter 12 has a frequency F, the transmitted signal received by antenna 20 will be applied to the harmonic generator and modulator 30 produces signals of harmonics of frequency F, such as 2F, 3F, etc. The amplitudes of these harmonic signals are changed when the voltage across the bypass capacitor 32 is changed. Since the leads 44 are connected across the capacitor 32, the harmonic signals of frequencies 2F, 3F etc., will be modulated by the response code or information signal to produce a modulated harmonic signal. This modulated harmonic signal is termed the response signal and is radiated by the antenna 20, connected to the capacitor 32, to a receiving station. FIG. 5C illustrates the amplitude of the envelope voltage of this response signal.

The receiving station includes a receiver antenna 48 which is connected to a receiver 50. This receiver 50 is tuned to one of the harmonic signals of frequency 2F, 3F, etc. and includes a demodulator to produce the response code or information signal from the received modulated harmonic signal.

As noted above, the transmitter 12 signal is a radio frequency continuous wave signal of frequency preferably in the microwave region. The response signal is at a frequency equal to a harmonic of frequency F and is pulse modulated to contain the information in the response code of information signal. While the harmonic of frequency 2F is normally the highest amplitude of any harmonic of frequency F and is therefore the preferred harmonic frequency, nothing herein is intended to limit the particular harmonic frequency of the response signal. Furthermore, various methods of modulating the harmonic can be utilized.

In order for the station 18 to operate properly at the low power levels required, the elements therein (i.e., the circuits 36–42) are fabricated from CMOS semiconductors or their equivalents. Thus, in an actual system the station required only 1.5 microwatts of DC power for operation. Additionally, it is contemplated that CMOS elements or their equivalents will be utilized in the modified embodiments of the remote stations disclosed below.

While the antenna 20 is shown as a single antenna it is noted that two separate antennas can be used, one of which would be connected to the detector 26 and the other of which would be connected to the harmonic generator and modulator 30. Alternatively three separate antennas can be used, one of which would receive the transmitted signal and transmit the same to the harmonic generator and modulator, and the third of which would receive the response signal from the harmonic generator and modulator and transmit the same to the receiver antenna 48.

FIG. 1 illustrates the use of bypass capacitors to extract the voltage from the detector 26 and to apply the response code signal to the harmonic generator and modulator 30. Other techniques can be used to extract and apply these voltages.

Receiving station 46 may derive its local oscillator signal from oscillator 14 and may be a superhetrodyne, homodyne, or any other conventional form of receiving station such as shown, for example, in the aforementioned U.S. Pat. No. 3,518,546.

The system shown in FIG. 1 may be utilized as a single remote station reading system and accordingly is referred to as a single station reading system. Totally passive stations may be attached to vehicles, articles, or personnel and later identified by use of techniques disclosed. Stations may be used to identify the street numbers of buildings or the identity of road intersections.

The "remote station" reading system of FIG. 1 may also be utilized to read meters from a distance. The meter is operated in conjunction with the response code control 42 such that the response code signal indicates the meter reading. As noted in detail below in conjunction with the operation of the system of FIG. 2, this meter reading system may be used to read water, electrical, fuel and similar meters.

While the system of FIG. 1 is ideally suited for an environment wherein an economical means of identification or information transmission is required from a signal station, the system presents a problem under conditions whereby a plurality of such stations are located in the path of the transmitted signal. More specifically, the stations may respond simultaneously so that response signals from one station will mask the response signals from other stations thereby preventing receipt of the desired information.

Figure 2:
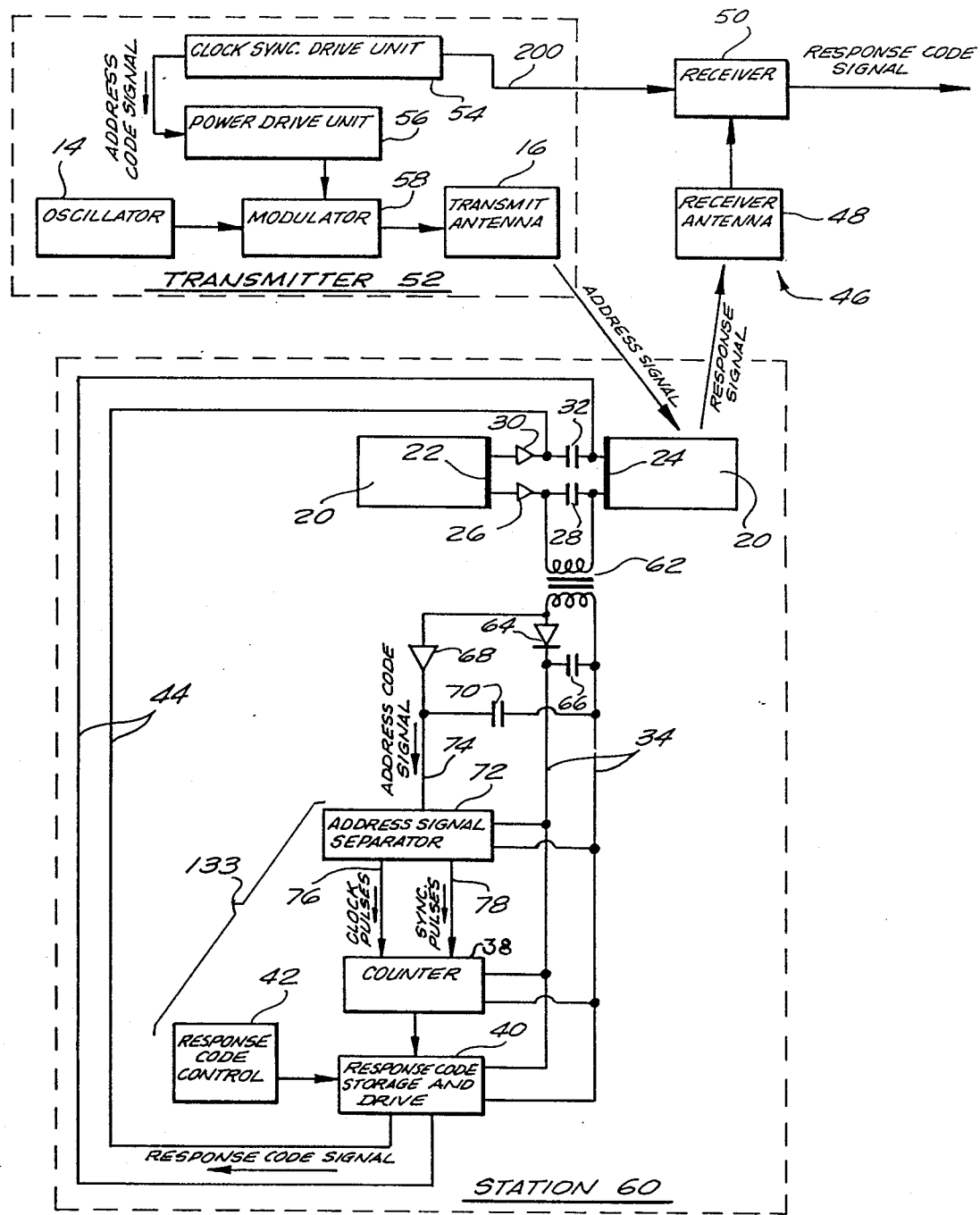

Accordingly, FIG. 2 illustrates a modified embodiment 110 of the system of the present invention which may be used similarly to the system of FIG. 1 where interference between stations is not a problem or it may be used to eliminate the interference problem. For ease of reference, similar reference characters have been utilized to indicate identical elements with respect to the system of FIG. 1 and only the difference between the two information systems will be described.

Thus, a transmitter 52 includes series chain comprising a clock-sync drive unit 54, a power drive unit 56, and a modulator 58 that is connected between the oscillator 14 and antenna 16. The clock-sync drive unit 54 produces an address code signal comprising a synchronizing pulse followed by clock pulses. A lead 200 connects the drive unit 54 to the receiver 50 for the reasons noted below. This address code signal is employed to control the digital information circuit included in the target or station 60. The power drive unit 56 produces a power signal, typically at a frequency of several hundred kilohertz such as 300 KHz and much higher in frequency than the frequency of the address code signal which may be several kilohertz, such as 2 KHz. This power signal is employed to reduce the rf voltage requirements at the target 60. The clock-sync drive unit 54 operates to turn off the power drive unit 56 during the time of occurrence of the clock and sync or synchronizing pulses. Accordingly, an address coded power signal is applied to the modulator 58 which operates to modulate the rf signal of frequency F produced by the oscillator 14 with this address coded power signal. The envelope voltage of this modulated address signal or illuminating signal, is illustrated in FIG. 6A.

Figure 6A:
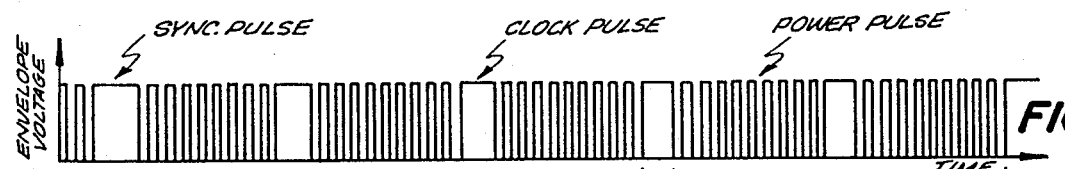
FIGS. 6A–6D illustrate waveforms appearing at different points in the system shown in FIG. 2.

As shown in FIG. 6A the sync pulses are of longer duration than the clock pulses to enable detection of the sync pulses. It should be noted that alternatively, the sync and clock pulses can also be represented by the absence of a transmitted signal.

The station 60 develops an AC voltage across the bypass capacitor 28 at the frequency of the power signal. The low voltage or primary terminals of a transformer 62 are connected across the bypass capacitor 28. This transformer 62 is tuned to resonate at the frequency of the power signal and is also matched to the load and operates to produce a higher voltage signal of this frequency at its output terminals. In other words, the carrier or radio frequency signals are bypassed by capacitor 28 whereas the envelope of the pulses which occur at the modulation frequency, are applied to the tuned transformer. Effectively, therefore, the sidebands of the illuminating signal are used to obtain the power signal to energize information circuit 133 of FIG. 2. That is, the modulating frequency is extracted from the sidebands of the transmitted signal and applied to the transformer 62. This arrangement produces a voltage or potential at the secondary terminals of the transformer that is sufficient to energize the information circuits 133. This is to be distinguished from use of the carrier signal (or the signal produced by oscillator 14) since the carrier signal does not produce a potential sufficiently high to energize the information circuits even though the carrier signal may contain sufficient power. That is, in the preferred embodiment, the CMOS semiconductor elements of the information circuit require a signal above a threshold voltage to operate. Although the sideband signals at the modulation frequency produce such threshold signal the carrier signal does not.

Figure 6B:
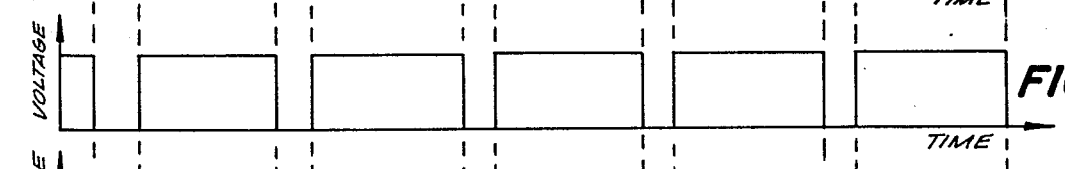
Figure 6C:
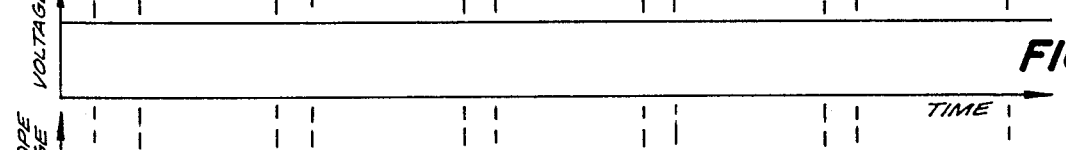

A series chain comprising a power signal detector 64 and a filter capacitor 66 is connected across the secondary terminals of the transformer 62. The capacitance of this filter capacitor 66 must be sufficiently high as to store voltage throughout the clock and sync pulses included in the address code signal and to power the digital information circuit. In the example under consideration, wherein 300 KHz is the modulating frequency, capacitor 66 may be 0.05uf. Accordingly, a DC voltage is developed across the filter capacitor 66, as illustrated in FIG. 6C.

A second series chain comprising an address code detector 68 and a bypass capacitor 70 is connected across the output terminals of the transformer 62. The capacitance of this bypass capacitor 70 must be sufficiently low as to transmit without significant distortion the clock and sync pulses included in the address code signal and must be sufficiently high as to store voltage throughout the period of the power signal. At the 300 KHz frequency, the value of the capacitor would be approximately 5uuf. Accordingly, the address code signal produced by the clock-sync drive unit 54 is developed across the bypass capacitor 70, as shown in FIG. 6B.

The digital information circuit 133 comprises a series chain comprising an address signal separator 72, the counter 38, and the response code storage and drive 40. Leads 34 are connected between the filter capacitor 66 and the power input terminals of the signal separator 72, counter 38, and response code storage and drive 40. A lead 74 is connected from the junction of the address code detector 68 and the bypass capacitor 70 to the address signal separator 72. This lead applies the address code signal comprising clock and sync pulses to the address signal separator 70. The power signal detector 64 and the address code detector 68 may comprise semiconductor diodes.

Figure 6D:
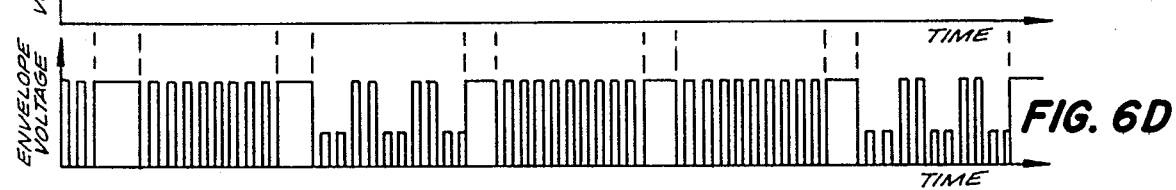

The address signal separator 72 is a pulse width discriminator that operates to separate the clock and sync pulses from the transmitted signal train. These separated signals are individually applied as pulses to the counter 38. The balance of the system is constructed and operates in the manner of the information circuit 33 of FIG. 1. FIG. 6D illustrates the amplitude of the envelope voltage of the response signal produced by the station 60.

Figure 9:
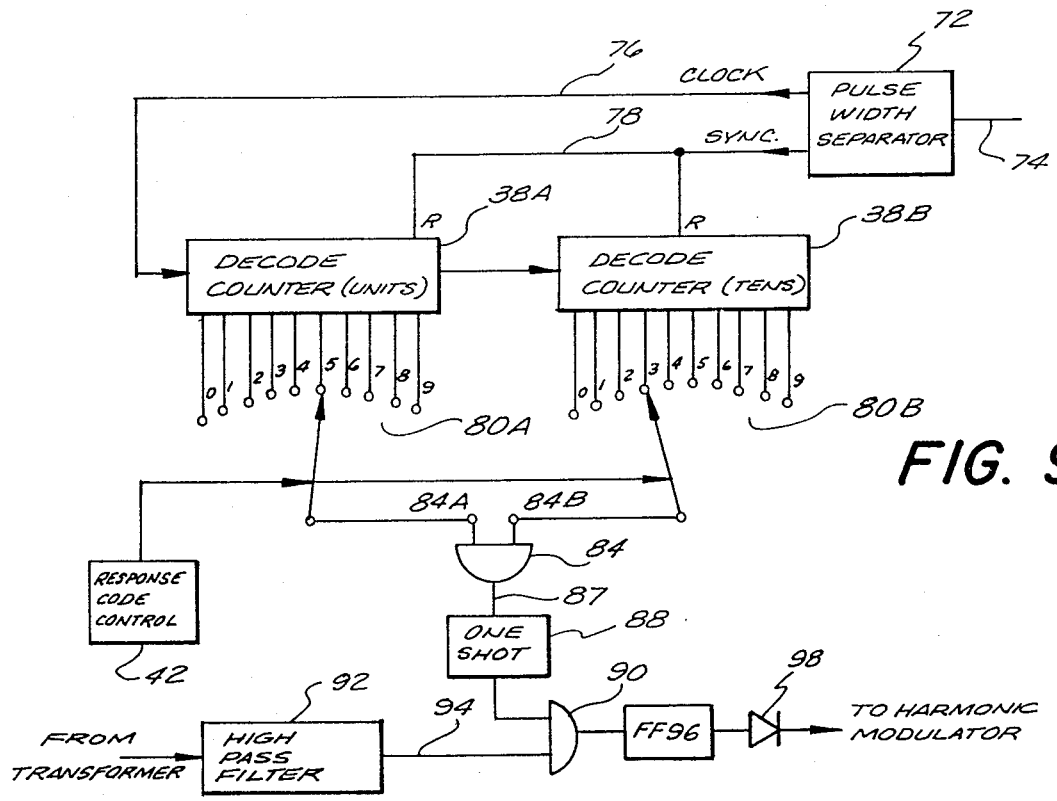
FIG. 9 is a schematic circuit wiring diagram, in block form, of the response code storage and related circuits shown in FIGS. 1–3.

The information circuit 133 of FIG. 2 is shown more particularly in FIG. 9. Thus, the information circuit shown therein may ideally be used when a plurality of remote stations are located in the path of the transmitted signal. Lead 74 applies the sync and clock pulses to address signal separator 72 which is a conventional pulse width detector that separates the clock and sync pulses in the conventional manner and applies the clock signals to the lead 76 and the sync signals to a lead 78. The counter 38 may comprise unit decade counter 38A and tens decade counter 38B connected to counter 38A. Lead 78 is connected to reset terminals R of the counters 38A and 38B and lead 76 is connected to the input terminals of the counter 38A. As shown in FIG. 6A, the sync pulse precedes the clock pulses. Accordingly, upon receipt of a pulse train, the sync signal on lead 78 will reset the counters 38A, 38B so that the counters begin counting clock pulses from a zero count.

The response code storage portion of the response code storage and drive unit 40 may comprise decade switches 80A, 80B and AND gate 84. Each one of the two input terminals 84A, 84B of the AND gate is individually connected to an output of the respective counters 38A and 38B through the associated decade switch. The terminals 0–9 of the switches are individually connected to the corresponding output terminals of the counters. As shown in FIG. 9, the arm of the switch 80A is connected to terminal 5 of counter 38A, and the arm of the switch 80B is connected to terminal 3 of the counter 38B. Upon receipt of the thirty-fifth clock pulse, an output signal will appear on a lead 87, which is connected to the output terminal of the gate 84. This is the only time during the transmission of a single pulse train that this station would respond. Other stations in the path of the transmitted signal would respond at a different cumulative count of clock pulses as determined by the setting of its switches 80A and 80B. Thus, a plurality of stations in the path of the transmitted signal can be identified.

The drive portion of the response code storage and drive unit 40 is connected to the output terminals of the AND gate 84 by the lead 87 and may comprise a one-shot or monostable multi-vibrator 88. The one-shot 88 produces a pulse of desired duration in response to an output signal from AND gate 84 and applies the same to an output terminal of AND gate 90. The other input terminals of the gate 90 may be connected via a lead 94 through a high pass filter 92 to a center tap on the secondary winding of the transformer 62 so that the demodulated address signal is applied to this terminal. The output terminals of the gate 90 are connected to the input terminals of a flip-flop or bistable multivibrator FF96, the output terminals of which are connected to the harmonic modulator 30 through a diode 98. FF96 operates to divide in half the modulating frequency applied to the flip-flop when gate 90 is enabled. Thus, assuming a modulating frequency of 300 KHz, the output signal of FF96 will vary at a 150 KHz rate.

The use of the 150 KHz modulating signal for the harmonic signals rather than use of a 300 KHz signal substantially eliminates clutter-type interference at the receiver from nearby stations. Hence this arrangement provides accurate response at high stability.

As noted above, the response code control 42 provides means for varying the time of occurrence of the response pulse produced by the AND gate 84 so that the harmonic modulating signal will indicate a value determined by the response code control 42, such as the reading of an electric meter. Thus, the control 42 may comprise motors connected to the sliding arms of decade switches 80A, 80B which control operation of each arm to a selected terminal representative of the value to be indicated.

Summarizing the operation of FIG. 9, receipt of the sync pulse resets the counters 38A, 38B to zero and the clock pulses will thereafter be counted in sequence. When the number of clock pulses in the transmitted pulse train reaches the desired number as determined by the setting of switches 80A, 80B, both input terminals of gate 84 will be enabled. Thus, a pulse will be produced by multivibrator 88. This will result in a burst of 150 KHz signals being applied as a modulating signal to the harmonic of the illuminating carrier signal. The burst is demodulated at the receiving unit 46 to indicate the desired information Additionally, the information circuit of FIG. 9 may be made responsive to a plurality of coded numbers rather than the single number "35" shown by adding additional AND gates which produce output signals in response to the desired counts in the counters. Thus, the 150 KHz bursts will occur at the desired times with reference to the sync pulse.

It will now be apparent that a feature of the present invention is the use of an illuminating signal that:

a. powers or energizes the circuits at the remote station b. generates the return harmonic carrier signal; and c. is also used to provide a sync signal.

It is obvious that the circuit of FIG. 9 can be used as a single "remote station" reading system when used in conjunction with the circuit of FIG. 1. In the case of FIG. 1, the clock pulses are derived from clock 36 rather than from signal separator 72. Additionally, the response code storage and drive 40 may contain a local modulating signal oscillator which is applied to AND gate 90 in place of the demodulated address signal to produce the modulating signal for the harmonic carrier.

In an actual construction of the circuit of FIG. 9, the following elements may be used. The decade counters 38A, 38B may comprise CMOS decade counters model No. CD 4017 manufactured by RCA. The gates 84 and 90 may comprise CMOS gates model No. CD 4011 manufactured by RCA. The flip-flop 96 may comprise a CMOS "D" type flip-flop model No. CD 4013 manufactured by RCA and the one-shot 88 may comprise a CMOS model No. CD 4001 element manufactured by RCA.

The sync pulses contained in the address signal of the system of FIG. 2 permits two or more targets or stations 60 to be positioned in the path of the address signal radiated from antenna 16. Different stations 60 are constructed so as to respond at different times with respect to the sync pulse in any one pulse train. The receiving unit 46 separately identifies the response signals from two or more stations by noting the time at which each response signal is received with respect to the time of transmission of the sync pulse. Accordingly, the receiving unit separately identifies two or more stations 60 positioned in the path of the address signal or counts the number of different stations so positioned. Thus, the circuit of FIG. 2 is referred to as a multiple station identification system when employed to read simultaneously two or more stations. This multiple station identification system may be utilized to simultaneously identify two or more articles, persons, or the like, or to count the number of such articles, persons, or the like that are present.

Figure 3:
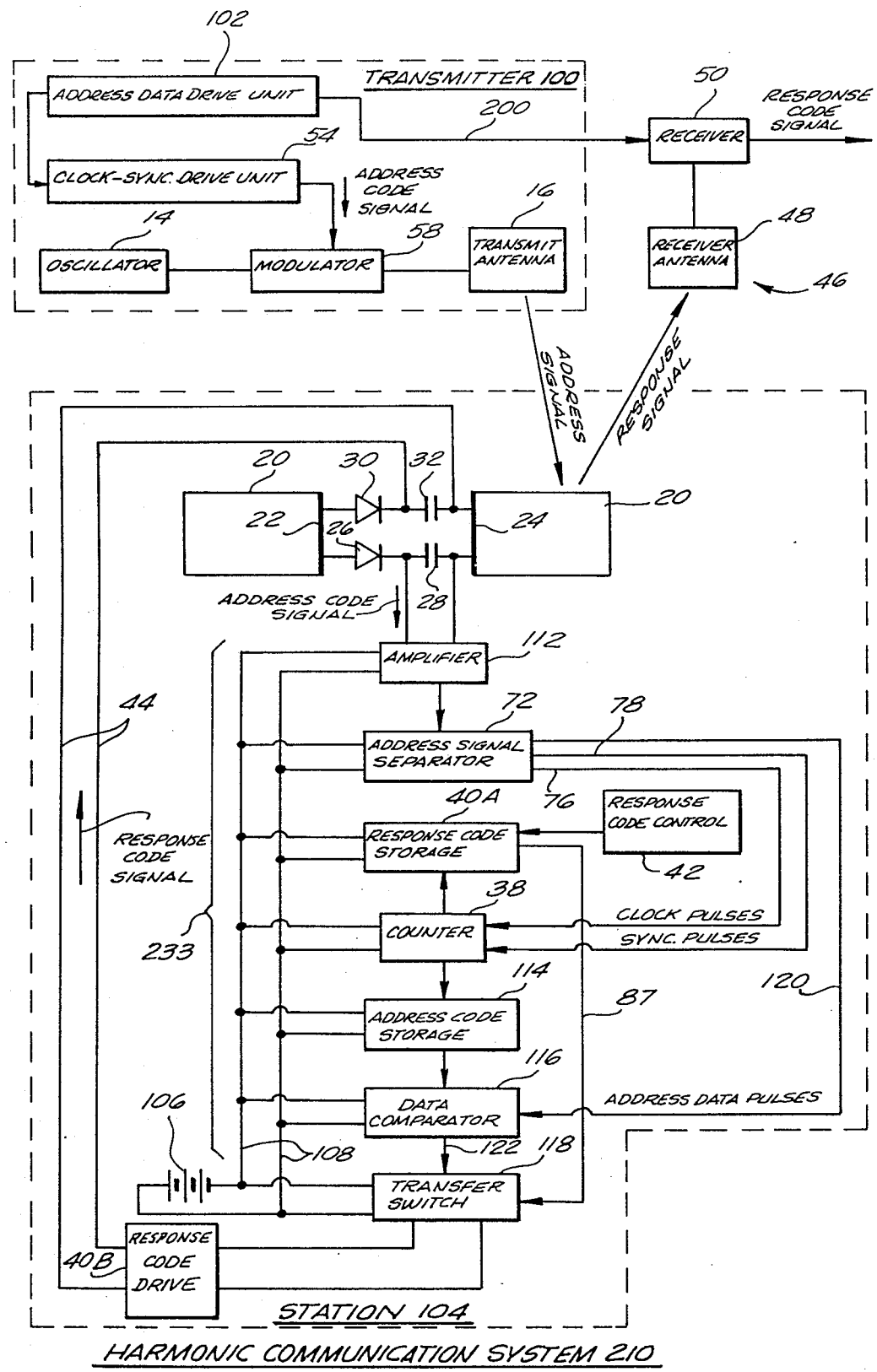

FIG. 3 illustrates further a modified embodiment of a harmonic communication system 210 constructed in accordance with the present invention wherein similar numerals in the FIGS. indicate identical elements. The transmitter 100 includes a clock-sync drive unit 54 connected to the modulator 58 and operable to turn off the rf signal of frequency F produced by the oscillator 14 during the time of the clock and sync pulses. An address data drive unit 102 is connected to the clock-sync drive unit and to the receiver 50 by a lead 200 for synchronization and operates to alter one or more of the clock pulses produced by the drive unit 54 by, for example, increasing the pulse width or the duration of the clock pulse. Accordingly, the address code signal applied to the modulator 58 contains clock, sync, and data pulses. FIG. 7A illustrates the envelope voltage of the address signal produced by the transmitter 100.

The station 104 may, if desired, include a battery 106 to operate the digital information circuit 233 included in the station although the circuit can also be powered in the manner indicated with respect to systems 10 and 110. Leads are connected between the positive and negative terminals of the battery 72 and the power input terminals of each of the components of the digital information circuit 233, which comprises a counter 38, a response code storage and drive 50, an address signal separator 72, an amplifier 112, an address code storage 114, a data comparator 116, and a transfer switch 118.

The address code signal produced by the clock-sync drive unit 54 is developed across the rf bypass capacitor 28 in the manner indicated above. This signal is amplified by the amplifier 112 and is applied to the address signal separator 72, which separates the clock, sync, and address data pulses contained in the address code signal by conventional pulse width detection. The clock and sync pulses appearing on the respective leads 76 and 78 are applied to operate the counter 38. The address data pulses are applied to the data comparator 116 via the lead 120.

It is to be noted that the response code storage and drive unit 40 of the preceding systems has been separated into a response code storage unit 40A and a response code drive unit 40B in the system of FIG. 3. However, the circuits comprising the respective units may be fabricated as shown in FIG. 9. The counter 38 is connected to the response code storage 40A. The response code storage 40A produces the response code signal as noted above, and applies this signal via the lead 87 to the transfer switch 118. The counter 38 is also connected to the address code storage 114. The address code storage 114 is similar to the storage portion of the circuit of FIG. 9 and produces a reference signal which is applied to the data comparator 116. The data comparator 116 is conventional and compares the reference signal from 114 with the address data pulses from the address signal separator 72 via the lead 120. When the data comparator 116 notes agreement between the address data pulses and the reference signal, the comparator operates to produce a signal on lead 122 to cause the transfer switch 118 to close for a predetermined time period sufficient to permit the response code signal (i.e., the signal from gate 84) to be applied to the response code drive through the switch 118. FIG. 7B illustrates the envelope voltage of the response signal produced by the station 104.

In particular, the comparator may contain at least an AND gate having one terminal gated to predetermined output terminals of the counter 38 through the address code storage 114. Another terminal of the AND gate is connected to the lead 120. The address code is such that after a number of clock pulses have been transmitted which are sufficient to enable the terminal of the AND gate connected to the address code storage, an address data pulse is transmitted thereby enabling the other terminal of the AND gate. For example, in a simple single bit code arrangement, if the gate is connected to the "5" terminal of the counter 38, one input terminal of the gate will be enabled after five clock pulses have been received. It it is desired to address the particular station having the "5" address, an address data pulse is transmitted in the fifth clock pulse slot, thereby enabling the other terminal of the AND gate. Hence, the AND gate will produce an output pulse that is applied to the transfer switch 118 to open the switch. Thereafter, the system operates in the same manner as described above.

In other words, the response code storage 40A and the response code drive 40B may comprise the circuit shown in FIG. 9 with the difference that the transfer switch 118 is connected between the one-shot 88 and the input terminal of the gate 90. Also, if desired, an oscillator of the desired frequency (300 KHz in the example under consideration) may be connected to the other input terminal of the gate 90 rather than using the demodulated 300 KHz signal.

If a more complex address is required, such as use of a five bit code or the like, additional conventional logic circuitry may be employed to accomplish the result.

The apparatus of FIG. 3 may be utilized to retrieve a particular station 104 from a plurality of such stations or targets. In this instance, the address data drive unit 102 in the transmitter 100 is programmed to correspond to the reference signal produced by the address code storage 114 of the desired station 104. In this instance, only the data comparator 116 of the desired target will note agreement between the address data pulses and the reference signal and thereby cause the response code signal from the desired target to be modulated on the harmonic signal transmitted from the station. The receiver 50 responds only to this modulation and thereby enables the retrieval of the desired target, even when this desired target is in close proximity to other targets with different address code storage 114. Accordingly, this usage of the circuit of FIG. 3 is referred to as a dial-type system.

This dial-type system is employed to locate and retrieve desired objects, vehicles, personnel, etc. For example, all of the cartons in a warehouse are tagged with stations or targets 104 and each target 104 contains a differently programmed address code storage 114. When a particular carton is desired, the address data drive unit 102 is programmed to correspond to the address code storage 116 in the target or station 104 on the desired carton. Only the desired target 104 will respond, enabling the location and retrieval of the desired carton.

The apparatus of FIG. 3 may also be utilized to separately identify two or more single remote stations or meter reading remote stations positioned in the path of the address signal radiated from antenna 16. In this instance, the system operates in the manner of the dial-type system described above except that the response code signal produced by the response code storage and drive 40 consists of a number of pulses corresponding to the identity or the condition of station 104. This type of system is employed to read two or more remote stations located in close proximity to each other. For example, an apartment house contains a number of electrical meters, each corresponding to a different apartment. Each meter is associated with a different station 104 and each meter controls the operation of the associated code control 42. The meter reader programs the address data drive unit 102 to correspond to the address code storage 114 of the station 104 that is associated with a particular apartment. The response signal in this instance is coded with the meter reading of that particular apartment. The meter reader records this meter reading and similarly proceeds to read all of the meters in the apartment house by properly programming the unit 102.

The apparatus of FIG. 3 may also be utilized to count all of the items in a selected category positioned in the path of the address signal. All items to be counted are tagged with a target or station 104. The items are separated into categories and all tags corresponding to a particular category are provided with the identically coded address code storage units 114 but with different response code storage units 40A so as to respond at different times with respect to the sync pulse. This usage of the circuit of FIG. 3 is referred to as a multiple timed system.

This multiple timed system may be used to take inventory of a number of different items. For example, the system is operable to first count all items of a particular category and then proceed to count all items in each such category.

Figure 4:
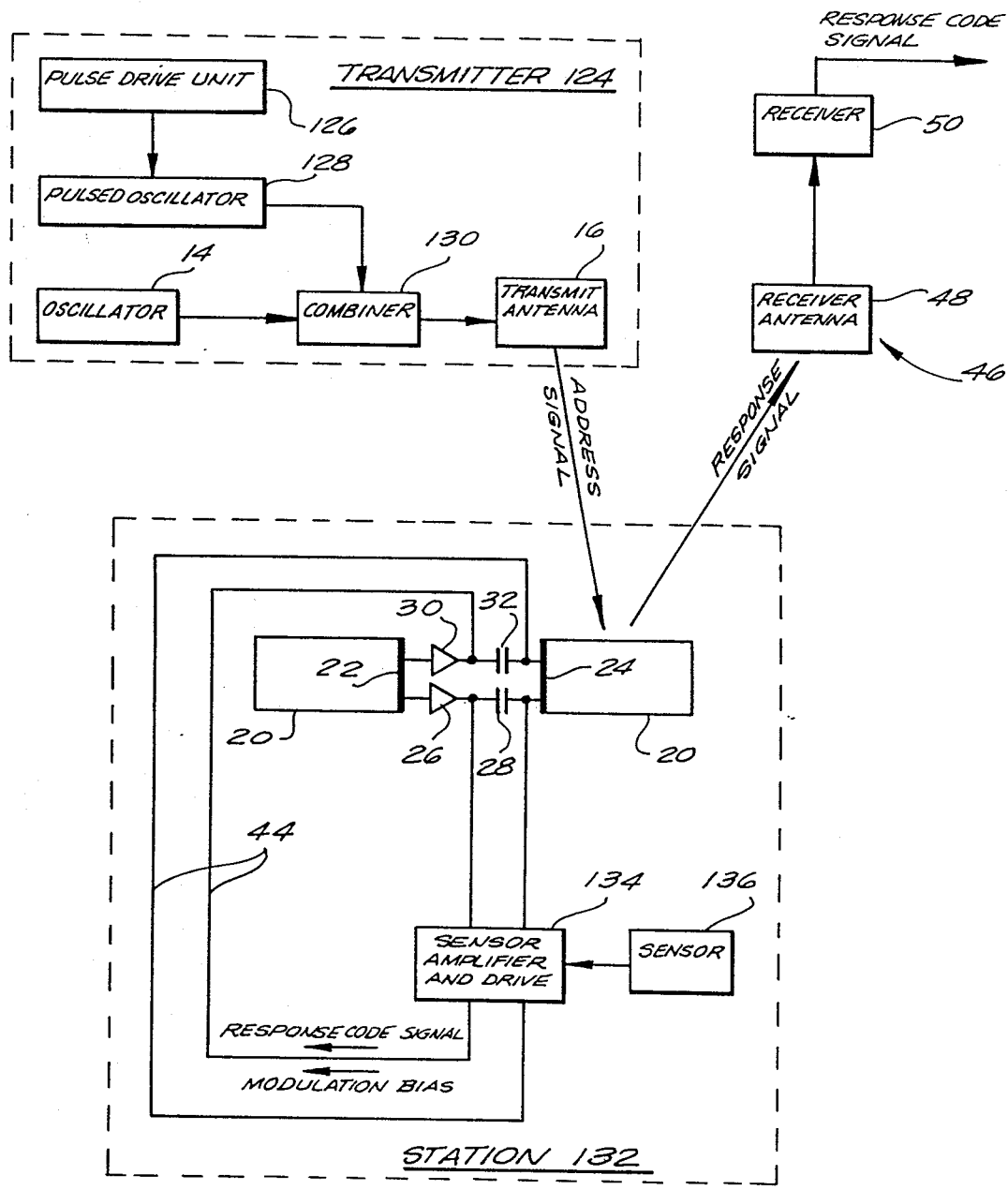

FIG. 4 illustrates a further harmonic communication system 310 constructed in accordance with the present invention. The transmitter 124 includes a series chain comprising a pulse drive unit 126, a pulsed oscillator 128, and a combiner 130. The combiner 130 is connected between the oscillator 14 and the transmit antenna 16.

The pulse drive unit 126 operates to cause the pulsed oscillator 128 to produce short bursts of an electromagnetic signal of frequency approximately equal to F, the carrier signal frequency or the frequency of the signal from oscillator 14. The pulsed signal produced by the pulsed oscillator 128 is combined with the lower amplitude cw signal of frequency F produced by the oscillator 14 to produce a pulsed cw address signal. FIG. 8A illustrates the amplitude of the envelope voltage of this address signal.

The pulsed address signal causes increased operating efficiency of the rf detector 26 for a given level of average power received by a station 132. The address signal is converted to a continuous DC power signal by the detector 26, 28 as shown in the voltage waveform-time graph of FIG. 8B. This DC power signal powers a sensor amplifier and drive 134. A sensor 136 is connected to the sensor amplifier and drive 134. This sensor 136 converts external signal such as seismic signals to electrical signals. These electrical signals are amplified by sensor amplifier and drive 134 and modulated onto the harmonic response signal. FIG. 8C illustrates the amplitude of the envelope voltage of this response signal.

In other words, assuming, for example, that sensor 136 is a seismic detector for producing seismic signals, the output signal of the amplifier 134 will be an amplifier seismic signal. The capacitor 32 is relatively small, as noted above, so that the DC signals caused by the transmitted pulses leak off rapidly. As a result, the pulses at a harmonic frequency of the transmitted signal will be modulated by the amplified seismic signals. Thus, the variations of the envelope of the signals shown in FIG. 8C represent the seismic information.

Receiver 50 may be provided with a filter to remove frequencies associated with the pulse drive unit 126.

The sensor amplifier and drive 134 also serves to produce a modulation bias voltage. This voltage is employed to back bias the harmonic generator and modulator 30 to minimize modulation current requirements. In other words, the diode 30 does not enter the conducting region so that power losses are minimized.

Figure 10:
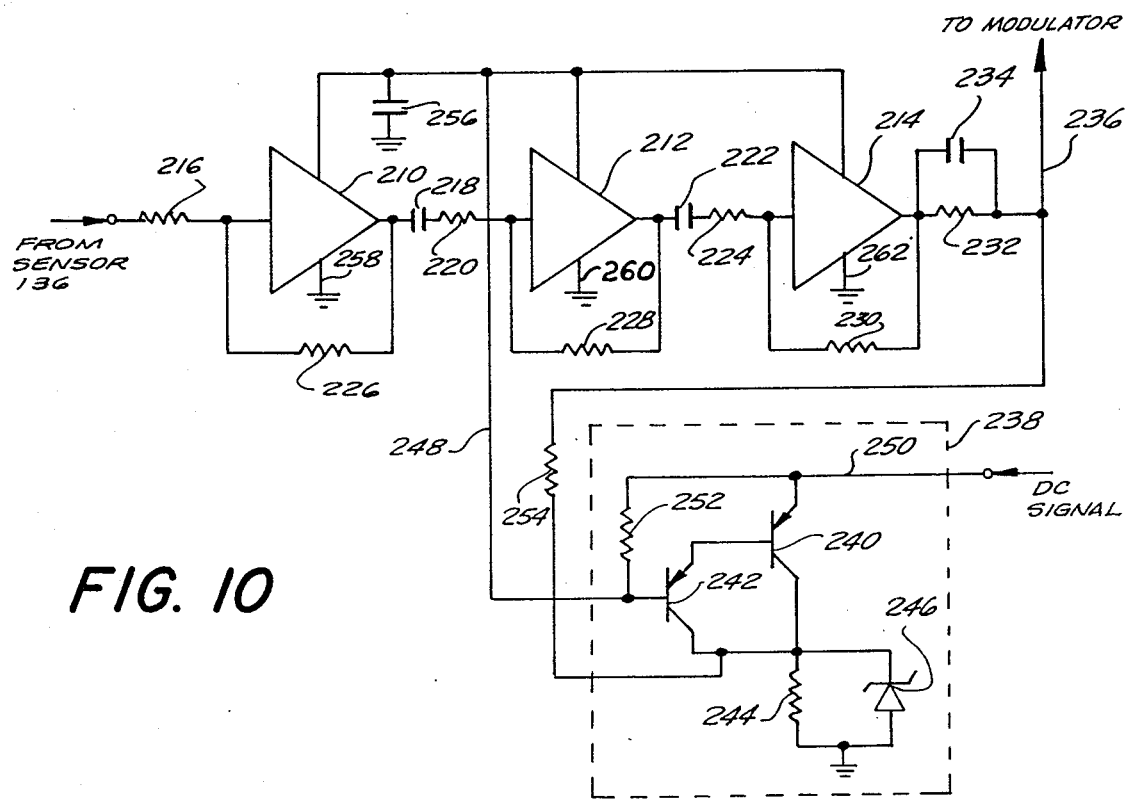
FIG. 10 is a schematic circuit wiring diagram of the sensor amplifier unit shown in FIG. 9.

One form of the sensor amplifier and drive is shown in FIG. 10 and comprises cascaded operational amplifiers 210–214. The output signal from sensor 136 is applied to the input terminal of the amplifier 210 through a resistor 216. The output signal from the amplifier 210 is applied to the input terminals of the amplifier 212 through a coupling network comprising a serially connected capacitor 218 and a resistor 220. Similarly, the output terminals of the amplifier 212 are connected to the input terminals of the amplifier 214 through a coupling network comprising a serially connected capacitor 222 and a resistor 224. Connected between the input and output terminals of each one of the amplifiers 210–212, is a respective resistor 226–230. The output signal from the amplifier 214 is connected to modulator 30 via a lead 236 through the parallel combination of a resistor 232 and a capacitor 234.

The amplifier and drive unit may also comprise a voltage regulator 238, which, in turn, comprises a Darlington connected pair of transistors 240 and 242. The collector electrodes of the transistors are connected to one end of a parallel network comprising a resistor 244 and a zener diode 246; the other end of the network is connected to ground. The base electrode of the transistor 242 is connected to one power input terminal of the amplifiers 210–214 via a lead 248. The other power terminal of the amplifier is connected to ground by the respective leads 258, 262. The base electrode of the transistor 242 is also connected to the emitter electrode of the transistor 240 through a resistor 252 via a lead 250, which receives the DC signal from the detector 26, 28. The collector electrodes of the transistors are also connected to the lead 236 through a resistor 254. A bypass capacitor 256 connects the lead 248 to ground.

In operation, the DC signal from the detector is applied to the voltage regulator 238 so that the voltage applied to the amplifiers is essentially independent of the received signal level. This arrangement provides a constant gain for the cascaded amplifiers. Accordingly, the input signal from the sensor 136 is amplified by the respective amplifiers and provides a signal on the lead 236 which is at least several tenths of a volt in amplitude. Moreover, the output voltage level from the voltage regulator 238 is sufficient to back bias the diode 330, as noted above.

In an actual embodiment, the amplifiers 210–214 may comprise a CMOS transistor array, model No. 3600E manufactured by RCA.

While the preferred embodiments of the invention have been shown and described herein, it will become obvious that numerous omissions, changes and additions may be made in such embodiments without departing from the spirit and scope of the present invention. For example, the more efficient pulsed cw address signal produced by the transmitter 124 of FIG. 4 can be used to power the station 18 of FIG. 1.

What is claimed is:

1. A communication system comprising transmitting means for transmitting a signal having a preselected frequency; a remote station comprising:

station receiving means for detecting said transmitted signal, information means for generating an information signal, power means connected to said station receiving means for producing a power signal from said detected signal to energize said information means, said power means comprising only a first two-terminal diode network comprising only semi-conductor diode means polarized in a single direction for conducting current in only one direction from one to the other of said two terminals of said first network.

response signal generating means connected to said station receiving means for producing a harmonic signal of said transmitted signal and for modulating said harmonic signal with said information signal to produce a response signal, said response signal generating means comprising only a second two-terminal diode network comprising only semiconductor diode means polarized in a single direction for conducting current in only one direction from one to the other of said two terminals of said second network.

and radiating means for radiating said response signal;

and a receiving station comprising means for demodulating said response signal to obtain said information signal.

2. A communication system as in claim 1, in which said information means comprises a plurality of stages of CMOS semiconductor elements.

3. A communication system as in claim 1, in which said information means comprises pulse generating means for producing a preselected sequence of pulses, and a station modulation signal generator responsive to said pulses for applying a modulation signal corresponding to said information signal to said response signal generating means.

4. A communication system as in claim 3, in which said pulse generating means comprises a clock for producing a train of pulses, a counter for counting individual pulses in said train of pulses, and code means responsive to predetermined counts of said counter for producing said preselected sequence of pulses.

5. A communication system as in claim 4, in which said code means comprises code varying means for varying the response of said code means to different predetermined counts of said counter.

6. A communication system as in claim 4, in which said transmitting means comprises means for transmitting a continuous wave signal.

7. A communication system as in claim 3, in which said transmitting means comprises a transmitter modulator for modulating said preselected frequency signal with an address code signal, and said remote station further comprises demodulating means for demodulating said preselected frequency signal to produce said address code signal, said pulse generating means being responsive to said address code signal to produce said preselected sequence of pulses.

8. A communication system as in claim 7, in which said address code signal comprises at least a sync pulse and clock pulses, said pulse generating means comprising detecting means for detecting said sync and clock pulses, a counter responsive to said sync pulse for producing a reference count and for incrementing said reference count in response to each clock pulse, and code means responsive to predetermined counts of said counter for producing said preselected sequence of pulses.

9. A communication system as in claim 8, in which said station modulation signal generator comprises gating means connected to said demodulating means and said code means for applying said demodulated address code signal to said response signal generating means during the reception of pulses from said code means.

10. A communication system as in claim 9, and a frequency divider between said gating means and said response signal generating means for dividing the frequency of said address code signal.

11. A communication system as in claim 1, in which said transmitting means comprises a transmitter modulator for modulating said preselected frequency signal with an address code signal, demodulating means at said remote station for demodulating said preselected frequency signal to obtain said address code signal, and switch means at said remote station for connecting said information means with said remote station response signal generating means in response to a predetermined address code.

12. A communication system as in claim 8, in which said address code signal further comprises a data signal, and switch means in said remote station responsive to a predetermined address code signal for connecting said code means to said station modulation signal generator.

13. A communication system as in claim 12, in which said detecting means further detects said data signal, and said switch means comprises an address storage means connected to said counter for producing an enabling pulse in response to a predetermined count, and comparing means responsive to the sequential reception of said enabling pulse and said data signal for producing a switch signal, and said switch means comprises a switch responsive to said switch signal for operating said station modulation signal generator to apply said modulation signal to said remote station response signal generating means.

14. A communication system as in claim 1, in which said transmitting means comprises a pulse modulator for superimposing at least a pulse on said preselected frequency signal, said information means comprising sensor means for producing a sensor signal proportional to a sensed quantity, and amplifying means for amplfying said sensor signal, means connecting said amplifying means to said response signal generating means, whereby said amplifying means signal corresponds to said information signal.

15. A communication system as in claim 14, in which said amplifier means comprises biasing means for producing a modulation bias voltage to maintain said second diode network in the non-conducting region.

16. A communication system as in claim 7, in which said preselected frequency signal is amplitude modulated by said transmitter modulator; and said power means further comprises means for producing a voltage substantially related to the frequency of the signal produced by said transmitter modulator, and said first diode network is operable to rectify said voltage.

17. A communication system as in claim 7, in which said preselected frequency signal is amplitude modulated by said transmitter modulator; and said power means further comprises a transformer connected to said demodulating means, said transformer having a primary winding tuned to the frequency of the signal produced by said transmitter modulator and a secondary winding connected to said information means, a rectifier connected between said secondary winding and said information means to produce a DC potential, and filter means connected to said rectifier to apply a substantially continuous level DC potential to energize said information means.

18. A method for transmitting information to a remote station having no source of energy therein comprising transmitting a signal having a preselected frequency to the remote station, detecting said preselected frequency signal at said remote station and producing a power signal from the detected signal by applying the preselected frequency signal to only a first two-terminal diode network comprising only semiconductor diode means polarized in only one direction, energizing an information signal generator with said power signal to generate an information signal, producing a harmonic signal from said transmitted signal by applying said transmitted signal to only a second two-terminal diode network comprising only semiconductor diode means polarized in only one direction, and modulating said harmonic signal with said information signal by applying said information signal to said second diode network.

19. The method of claim 18, in which the power signal produced at said remote station is a DC signal.

20. The method of claim 18, comprising the further steps of transmitting said modulated harmonic signal to a receiving station, and demodulating said modulated harmonic signal at said receiving station to obtain said information signal.

21. The method of claim 18, in which said step of generating said information signal comprises generating a preselected sequence of pulses, and producing a modulating signal during the generation of each one of the pulses in said preselected sequence.

22. The method of claim 18, in which said step of transmitting said signal of preselected frequency comprises generating a carrier signal, and modulating carrier signal with said signal of preselected frequency to obtain a pulse train; detecting said pulse train at said remote station; and generating said information signal in response to said pulse train.

23. The method of claim 22, comprising the further step of applying said modulating signal to said harmonic signal only in response to the reception of a preselected arrangement of pulses in said pulse train.

24. The method of claim 23, in which said preselected arrangement of pulses in said pulse train comprises an address code, and said method comprises the further steps of storing a desired address code at said remote station, comparing said stored address code with said transmitted signal address code, and applying said information signal to said harmonic signal only in response to an equality between said compared codes.

25. The method of claim 22, in which said power signal is derived from the sideband signals of said modulated carrier signal.

26. A communication system comprising a transmitter having carrier signal generating means for generating a carrier signal having a preselected frequency, transmitter modulating means for modulating said carrier signal with a modulation signal, said modulation signal comprising reference and clock signal portions, and radiating means for radiating said modulated carrier signal; at least one remote station for receiving said modulated carrier signal, said remote station comprising demodulating means for demodulating said carrier signal to obtain said modulation signal, counting means responsive to said reference signal for producing a reference count and for incrementing said reference count in response to each of said clock signals, code means responsive to a predetermined count for producing an enabling signal, a modulation signal generator for generating a station modulation signal in response to said enabling signal, and station modulating means for modulating a harmonic signal of said carrier signal with said station modulation signal; and a receiving station for receiving said modulated harmonic signal, said receiving station comprising receiving means for demodulating said modulated harmonic signal to obtain said station modulation signal.

27. A communication system as in claim 26, and means for applying the reference signal portion of said transmitter modulation signal to said receiving means.

28. A communication system as in claim 26, in which said counting means, code means and said modulation signal generator comprise CMOS semiconductor elements.

29. A communication system as in claim 26, in which said station modulating means comprises a semiconductor diode.

30. A communication system as in claim 26, in which said counting means comprises a counter having a reset terminal adapted to receive said reference signal to reset said counter, and an input terminal adapted to receive said clock signals to increment said counter, said reference signal comprising a pulse of preselected duration, said clock signal comprising pulses having a duration other than said preselected duration, said counting means further comprising pulse discriminating means for applying said reference pulse to said counter reset terminal and said clock pulses to said input terminals.

31. A communication system as in claim 26, and a plurality of remote stations, said code means of each of said plurality of remote stations being responsive to a different count whereby said enabling signal at each remote station is generated at different times during a cycle of transmission of said carrier signal.

32. A communication system as in claim 26, wherein said transmitter modulation signal further comprises a data signal portion, comparing means in said remote station for generating a switch signal in response to a preselected data signal, and switch means responsive to said switch signal for applying said enabling signal to said modulation signal generator.

33. A communication system as in claim 32, in which said data signal comprises a plurality of pulses, and a plurality of remote stations each having said comparing means therein, said comparing means of preselected stations having signal generating means to generate said switch signal in response to different cumulative numbers of said data pulses in a cycle of transmission of said carrier signal.

34. A communication system as in claim 33, in which said plurality of remote stations are divided into different groups, said comparing means in the same group of stations being responsive to the same number of data pulses to produce said switch signal at the same time, said comparing means in different groups of stations being responsive to different numbers of said data pulses to produce said switch signal at different times.

35. A communication system as in claim 34, wherein said code means within said same group of remote stations is responsive to a different count whereby said enabling signal at each remote station within said same group of remote stations is generated by different times during a cycle of transmission of said modulated carrier signal.

* * * * *